Figure 1:
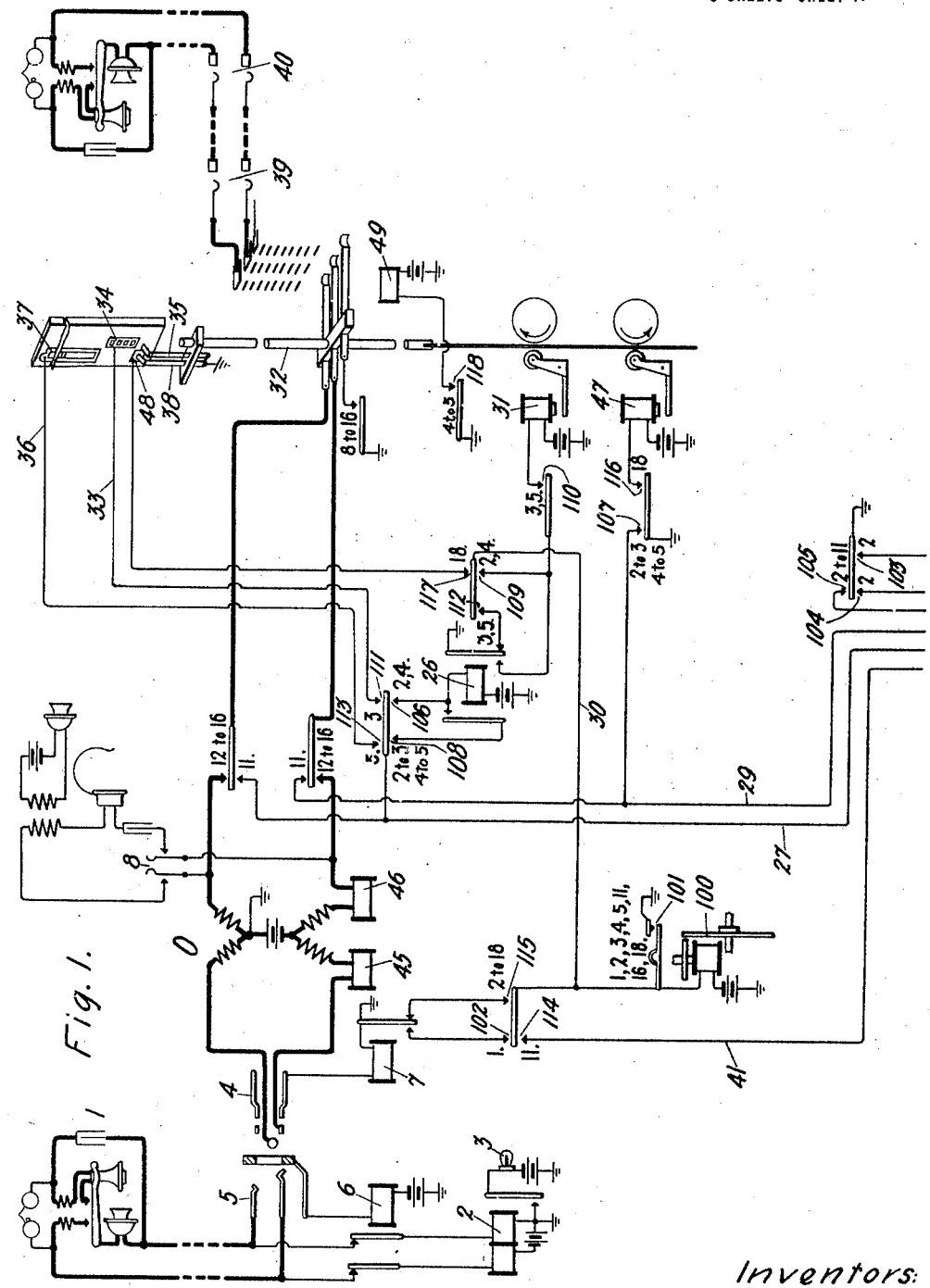

A. E. LUNDELL AND E. W. HANCOCK.
SENDER TESTING SYSTEM.
APPLICATION FILED DEC. 30, 1916.

1,334,767.

Patented Mar. 23, 1920.
5 SHEETS—SHEET 2.

Inventors:
Alben E. Lundell.
Edmund W. Hancock
by [signature] Att'y.

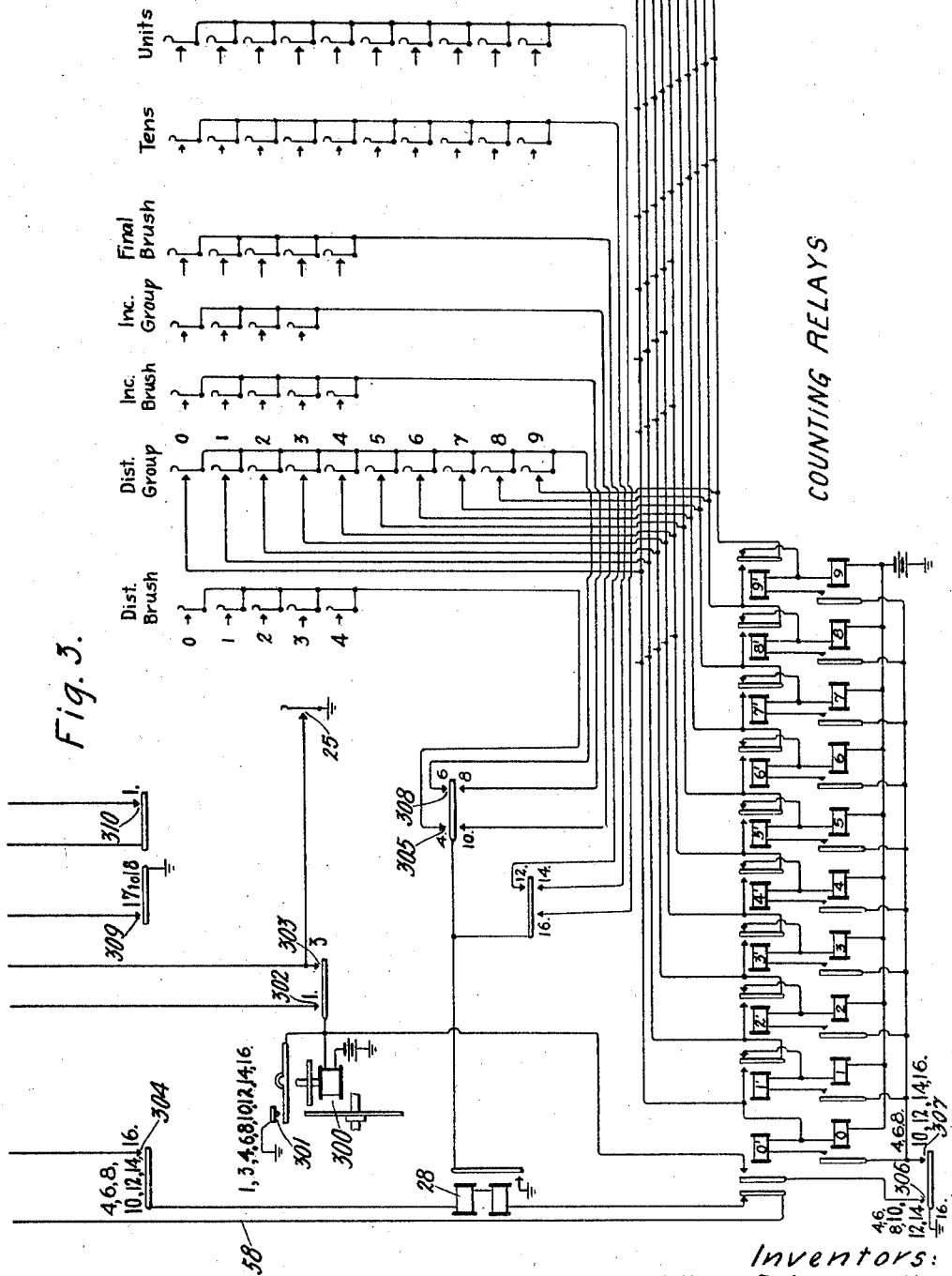

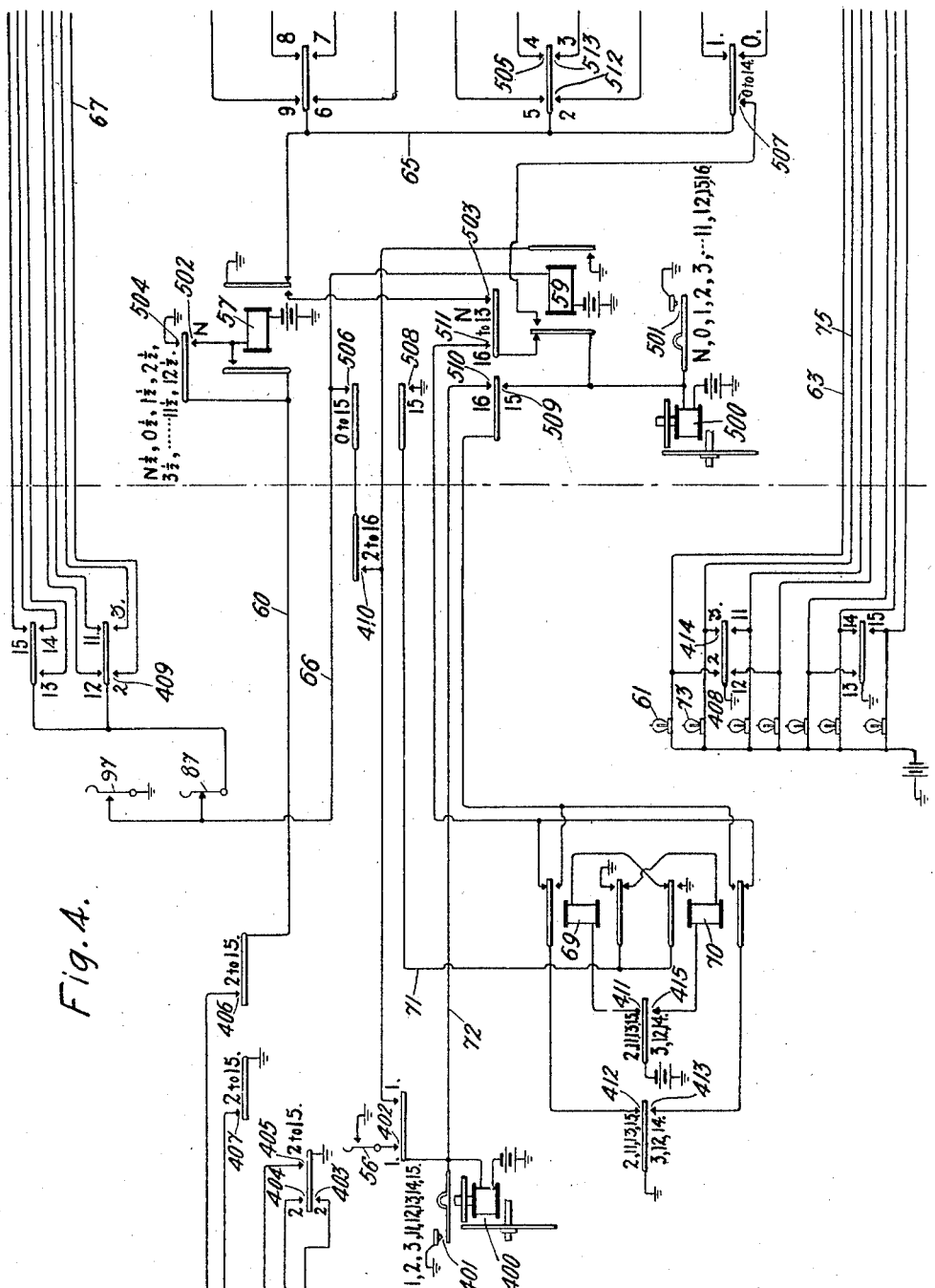

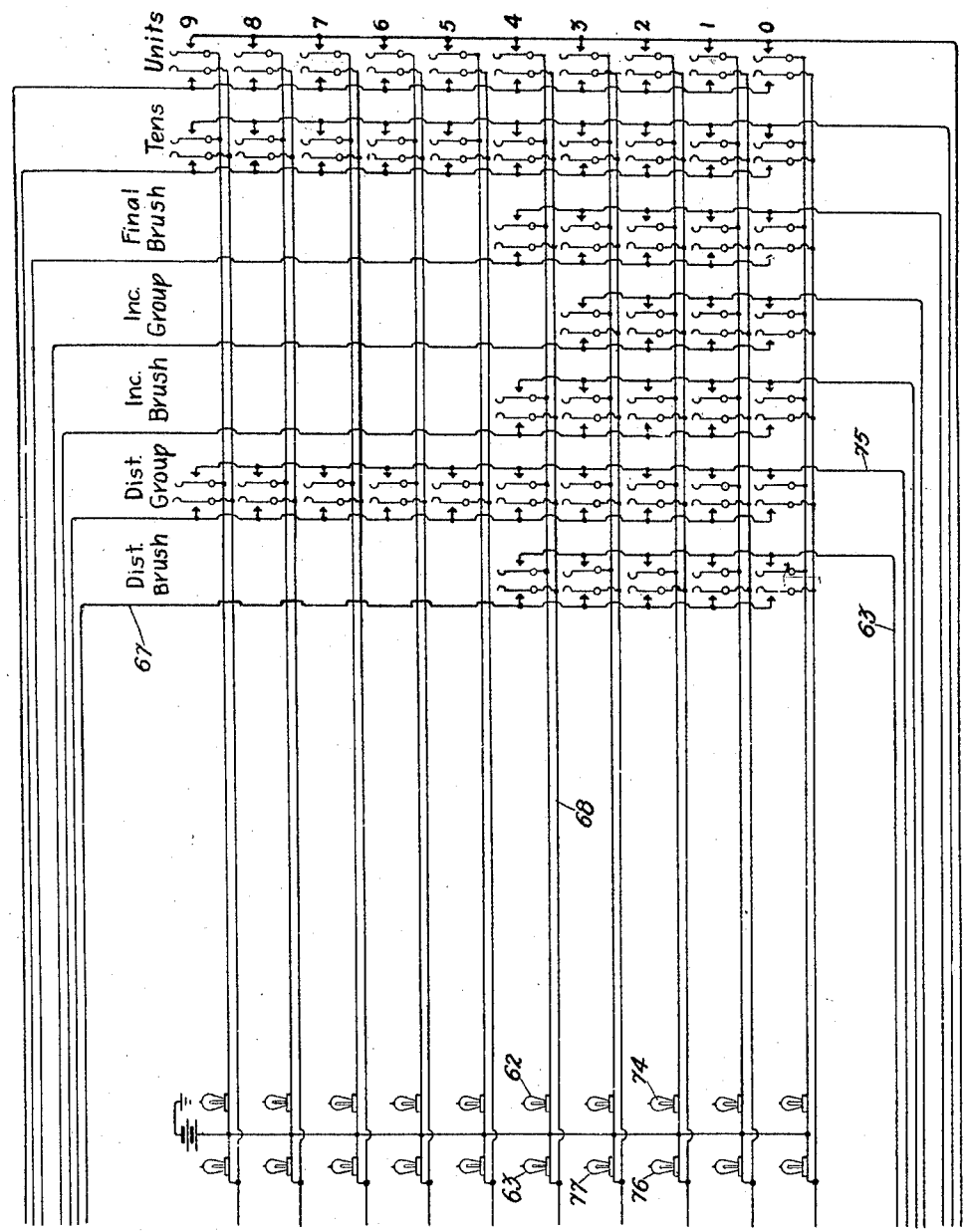

UNITED STATES PATENT OFFICE.

ALBEN E. LUNDELL, OF NEW YORK, N. Y., AND EDMUND W. HANCOCK, OF WILMINGTON, DELAWARE, ASSIGNORS TO WESTERN ELECTRIC COMPANY, INCORPORATED, OF NEW YORK, N. Y., A CORPORATION OF NEW YORK.

SENDER-TESTING SYSTEM.

1,334,767.    Specification of Letters Patent.    Patented Mar. 23, 1920.

Application filed December 30, 1916. Serial No. 139,934.

*To all whom it may concern:*

Be it known that we, ALBEN E. LUNDELL and EDMUND W. HANCOCK, citizens of the United States, residing at New York, in the county of Bronx and State of New York, and at Wilmington, in the county of New Castle and State of Delaware, respectively, have invented certain new and useful Improvements in Sender-Testing Systems, of which the following is a full, clear, concise, and exact description.

This invention relates to telephone exchange systems in which automatic switches are used to establish connections, either wholly or in part, and is more particularly related to systems in which such switches are controlled by means of a sender located at a central office.

The object of this invention is to provide an improved arrangement for testing such senders. In senders of the reverse impulse type, that is, senders which are operated in response to the movements of a switch or switches controlled by them, the arrangement has been such that after a switch has been positioned in accordance with a setting of the sender, such circuit changes will take place both at the switch and at the sender so that the switch may be controlled in another of its movements. Similarly, a succeeding switch or switches may be brought under the control of the sender, whose associated controlling device moves from position to position upon the termination of the sending of each set of impulses.

In the present arrangement, it has been proposed to provide a testing circuit arrangement which will operate a sender in a manner similar to that in which it would be actuated in response to the movements of the switches normally controlled by it.

More particularly it is the object of this invention to provide a testing arrangement of the above described character in which testing will be continued automatically as long as the sender is operating accurately, but which will prevent further progress of the test at any time that incorrect operation occurs.

The sender testing device as disclosed in the present description is designed to operate in connection with senders of the type used in power driven systems of the semi-automatic type such as disclosed in Patent No. 1,168,319. The invention is not, however, to be restricted to use with any particular system, since it may be broadly applied to a large variety of systems.

The testing device includes broadly a key set, a series of matching lamps, a series of progress lamps, a progress-controlling sequence switch and an impulse sending sequence switch. These devices are mounted in a suitable carriage of any convenient form, the present invention being concerned only with the circuit arrangement of the testing device.

The general operation of the arrangement is as follows: The jacks associated with the test box and indicated at 50 and 51 of Figure 2 of the drawings are arranged to be connected by double plug-ended links 52 and 53 to jacks 54 and 55, in which terminate lines running from the contact set of a cord finder. The cord finder will automatically hunt for calling terminals in a manner similar to that in which it seeks out a cord circuit in the regular operation of a semi-automatic system. The sender keys will be depressed in accordance with any desired number, and the person making the test will depress keys in the testing device key set corresponding to the number of impulses to be sent. The matching lamps consist of two rows of lamps, the lamps in one row being lighted during the sending of each series of impulses in accordance with the number set up by the testing operator. The lamps in the second series are lighted at proper times to indicate the number of impulses actually sent in response to the setting of the regular operator's key set. Thus, if a selection is properly made, this fact will be indicated by the lighting of adjacent lamps at the close of the sending of each set of impulses. The progress sequence switch controls, at its contacts, circuits to cause the lighting of matching lamps associated with the various keys in a definite order, and controls also a series of progress lamps which indicate the stage of operation and inform the operator which series of impulses is being sent at any time.

A feature of the present invention resides in the provision of means for allowing the testing device to continue its operation only so long as the sender is operating correctly. This is accomplished by means of a relay which is energized after the impulse sending sequence switch has been positioned to indicate the number of impulses sent. Upon the energization of this relay a circuit is completed for moving the impulse sending sequence switch into a position from which it may be restored to normal. As a result of incorrect operation of the sending device, the energizing circuit of this relay will not be completed, and the testing device will remain at rest in the position at which incorrect operation occurred.

It is thought that the invention will be best understood from the following detailed description, reference being had to the accompanying drawings.

Figure 2:
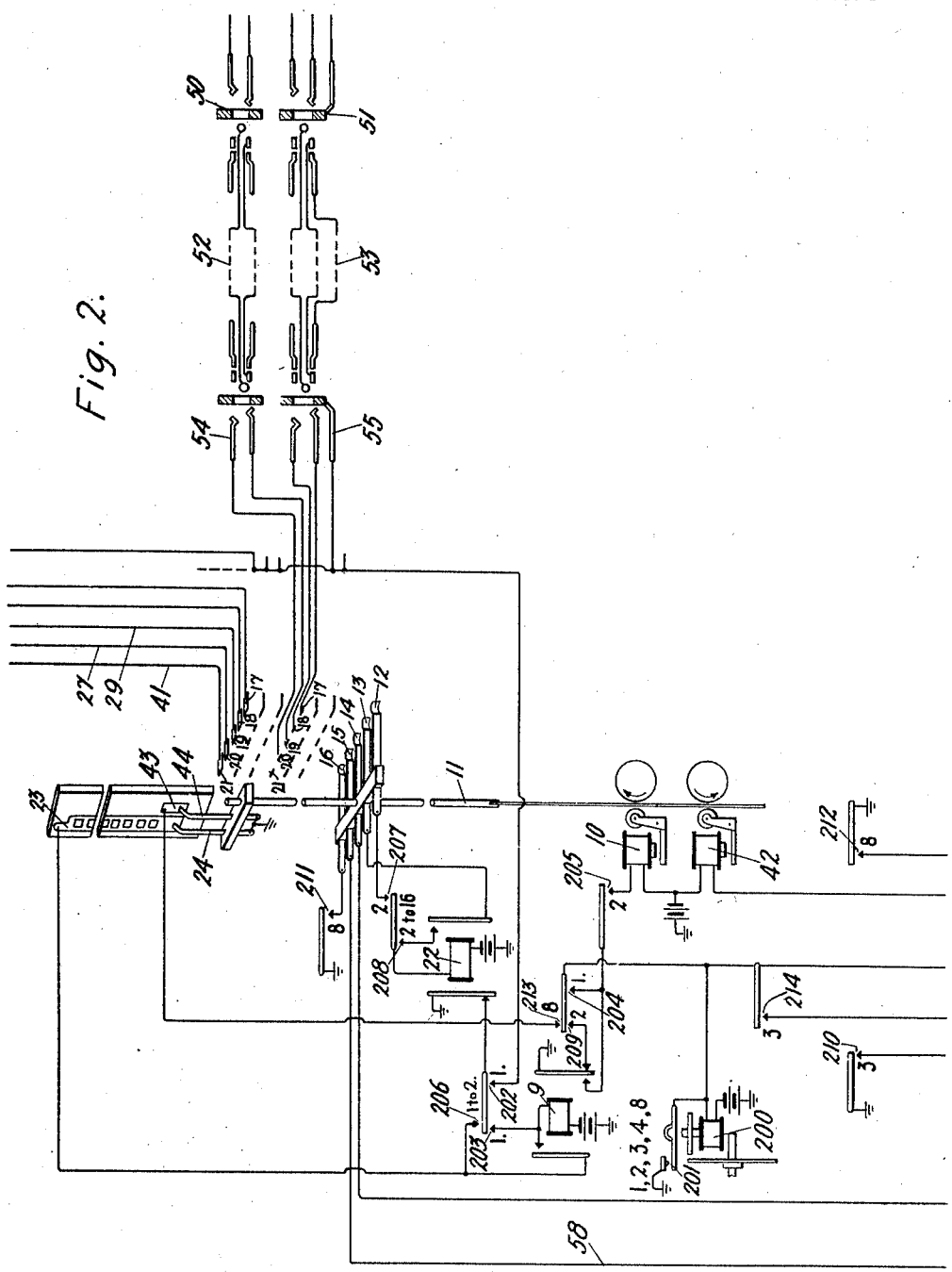

In the drawings, Fig. 1 shows a calling and a called substation together with an automatic switch whose circuits are partially shown, and additional switches which are schematically indicated. In Fig. 2 are shown the circuits of a cord finder used to associate an operator's sender and key set with a desired cord. Fig. 3 shows portions of an operator's sender and key set circuits. Figs. 4 and 5 disclose operating circuits of a testing arrangement embodying the present invention.

The operator's key set as shown in Fig. 3 is not of the type commonly used, since in operation as ordinarily practised, the number of impulses to be sent during the first two selections is determined by the depression of a single key, and the number of impulses sent during the remaining five selections are determined by the depression of four keys, in accordance with the numerical designation of the wanted line. Since, however, the keys associated with the testing arrangement are arranged to be depressed in accordance with the number of impulses actually to be sent, it has been assumed that in this case, the operator will also depress keys in accordance with the number of impulses actually to be sent.

The regular operation of the sender to be tested, as used in setting up a connection between two subscribers, will first be described, after which its operation in connection with the testing device will be described.

If now we assume that the number of the wanted subscriber is 3416 and that his substation is served through an office whose trunks terminate in the third sub-group of the fifth main group of terminals served by the switch shown in Fig. 1, the operation will be as follows:

The operator will depress district brush key 4 and district group key 2. Since the number of the wanted line is 3416, a final switch must be seized which terminates in the second main group and second sub-group of the contacts of an incoming switch at the office selected, and therefore incoming brush key 1 and incoming group key 1 will have to be depressed. At the final switch, the terminals of the wanted line will be found in a group served by the fifth brush, and therefore final brush key 4 will have to be depressed. Since the desired hundreds group has now been located, the depression of the number 1 key in the tens column and the number 6 key in the units column will serve to control the last two selections in obtaining the desired line.

The subscriber at substation 1, when desiring a connection, removes his receiver from the hook, whereupon line relay 2 is energized to cause the display of a line signal 3 in the well-known manner. An operator, one of whose cords is indicated at 0, upon observing the lighting of signal 3 inserts a plug 4 into a jack 5, associated with the signal 3. A circuit is then completed from grounded battery, cut-off relay 6, sleeve contacts of jack 5 and plug 4, cord relay 7 to ground. Relays 6 and 7 are energized in this circuit, cut-off relay 6 operating to remove the control of line relay 2 from the calling subscriber, and relay 7 completing a circuit from grounded battery, power magnet of sequence switch 100, contact 102, front contact and armature of relay 7, to ground, for moving sequence switch 100 out of position 1 and into position 2, under the control of its normal spring 101. By depressing a listening key 8, the operator completes a talking circuit to the calling subscriber and may ask the number of the wanted line. Upon learning that the desired subscriber's number is 3416 in an office the trunks to which terminate in the third subgroup of the fifth main group of trunks of the district selector, she will depress keys in the key set shown in Fig. 3 as previously described.

When the sequence switch 100 arrives in position 2, a circuit is completed from ground, contact 103, contacts 202, 203, winding of relay 9, to grounded battery.

Relay 9 is energized and at its right-hand armature and front contact, completes a circuit from grounded battery, power magnet of sequence switch 200, contact 204, armature and front contact of relay 9, to ground, which moves sequence switch 200 from position 1 to position 2, under the control of its normal spring 201. In position 2 of sequence switch 200, a circuit is completed from grounded battery, up-drive magnet 10, contact 205, armature and front contact of relay 9, to ground, which causes the cord finder brush shaft 11 to be moved upwardly, advancing brushes 12, 13, 14, 15 and 16 over terminals 17, 18, 19, 20 and 21 associated with the various cord circuits. Relay 9 upon energization locks itself over a path from grounded battery, winding of relay 9, its left-hand armature and front contact, contact 206, armature and back contact of test relay 22, to ground. When the cord finder brushes engage the terminals of the proper cord, relay 22 is energized over a circuit from grounded battery, winding of relay 22, contact 207, brush 12, terminal 17, contact 104, to ground, and immediately locks up over a path from grounded battery, winding of relay 22, contact 208, right-hand armature and front contact of relay 22, brush 13, terminal 18, contact 105, to ground. The energization of relay 22 opens one branch of the locking circuit of relay 9, but this relay is maintained energized over a branch path from grounded battery, winding of relay 9, left-hand armature and front contact of relay 9, conducting segment of commutator 23, brush 24, to ground, until brush 24 engages an insulating segment of commutator 23, at which time the brush will be accurately centered on the terminals of the desired cord. Relay 9 then deënergizes, opening at its right-hand armature and front contact, the circuit of up-drive magnet 10 and completing at its right-hand armature and back contact a circuit from grounded battery, power magnet of sequence switch 200, contact 209, right-armature and back contact of relay 9, to ground which moves this sequence switch from position 2 to position 3.

In position 3 of sequence switch 200, a circuit is completed from grounded battery, power magnet of sequence switch 300, contact 302, contact 210, to ground for moving sequence switch 300 out of position 1 and into position 3, under the control of its normal spring 301.

The operator having learned the number of the wanted line and having depressed the proper keys, now depresses a start key 25, which completes a circuit from grounded battery, power magnet of sequence switch 300, contact 303, contacts of key 25, to ground, which moves this sequence switch out of position 3 into position 4. Start key 25 also completes a circuit from grounded battery, power magnet of sequence switch 200, contact 214, contacts of key 25, to ground, which moves sequence switch 200 into position 4.

A circuit is now completed for the district line relay 26 over the fundamental circuit, from grounded battery, winding of relay 26, contact 106, conductor 27, terminal 20, finder brush 15, outer armature and back contact of the upper 0′ counting relay, windings of stepping relay 28, contact 304, finder brush 14, terminal 19, conductor 29, contact 107, to ground. Relay 26 locks itself to conductor 27, through its left-hand armature and front contact and contact 108, and also completes a circuit from grounded battery, power magnet of sequence switch 100, conductor 30, contact 109, right-hand armature and front contact of relay 26, to ground, for moving sequence switch 100 out of position 2 and into position 3.

In position 3 of sequence switch 100, a circuit is completed from grounded battery, power magnet 31, contact 110, right-hand armature and front contact of relay 26, to ground. Brush rod 32 is moved upward under the control of power magnet 31 and advances the brush sets carried by it to a position wherein one of them may be tripped.

Upon the first closure of the fundamental circuit, stepping relay 28 was energized, whereupon a circuit was completed for the number 4 counting relay, from grounded battery, winding of number 4 counting relay, armature and back contact of number 4′ counting relay, contacts of depressed key 4 in the district brush column, contact 305, armature and front contact of stepping relay 28, to ground. Relay 4 is energized and prepares a path for the number 4′ counting relay in the well-known manner.

As the brush rod 32 moves upwardly, the circuit of stepping relay 28 is intermittently shunted by a branch of the locking circuit of relay 26, which extends through contacts 108 and 111, conductor 33, accurate centering segment 34, brush 35, to ground. The action of relay 28 results in the successive actuation of the counting relays in the well-known manner. When the upper 0′ counting relay is energized, the branch of the fundamental circuit through stepping relay 28 is permanently broken, and when, a moment later, centering brush 35 engages an insulating segment of commutator 34, relay 26 is deënergized, opening at its right-hand armature the circuit of up-drive magnet 31 and maintaining brush rod 32 in a position wherein the fifth set of brushes may be tripped. A circuit is also completed from grounded battery, power magnet of sequence switch 100, conductor 30, contact 112, armature and back contact of relay 26 to ground, for moving this sequence switch from position 3 to position 4. A circuit is now completed from grounded battery, winding of trip magnet 49, contact 118 to ground to operate the trip rod to release the positioned set of brushes.

The energization of the upper 0′ counting relay completes a circuit from grounded battery, power magnet of sequence switch 300, inner armature and front contact of the upper 0′ counting relay, contact 306, to ground, which moves this sequence switch from position 4 to position 6.

When sequence switch 300 leaves position 4, the locking circuit of the counting relays is broken at contact 307, and they are deënergized.

In position 4 of sequence switch 100, and in position 6 of sequence switch 300, relay 26 is again energized over the fundamental circuit previously described, and again locks itself to conductor 27. A circuit is also completed from grounded battery, power magnet of sequence switch 100, conductor 30, contact 109, armature and front contact of relay 26, to ground, for moving this sequence switch out of position 4 and into position 5.

In position 5 of sequence switch 100, the circuit of up-drive magnet 31 is again closed from grounded battery, winding of magnet 31, contact 110, armature and front contact of relay 26 to ground, again causing upward motion of the brush rod 32.

The closure of the fundamental circuit again causes the energization of stepping relay 28. A circuit is then completed from grounded battery, winding of the number 2 counting relay, contacts of key number 2 in the district key column, contact 308, armature and front contact of stepping relay 28, to ground. Counting relay number 2 is energized and prepares a circuit for the number 2' counting relay in the well-known manner. During the upward motion of the brush rod, stepping relay 28 is again intermittently shunted by a branch of the locking circuit of relay 26, through contacts 108, 113, conductor 36, accurate centering segment 37, brush 38, to ground. The action of stepping relay 28 results in the successive energization of the counting relays, and when the 0' counting relay is energized, it opens, at its outer armature, the lower branch of the locking circuit of relay 26. When brush 38 engages an insulating portion of commutator 37, relay 26 is deënergized, opening, at its right-hand armature, the circuit of the up-drive magnet 31, and stopping the brush shaft with the fifth set of brushes at the bottom of the third subgroup of trunks, the trunks therein leading to the desired office. The 0' counting relay at its inner armature and front contact completes a circuit for moving sequence switch 300 from position 6 to position 8. Relay 26 upon deënergization also completes a circuit from grounded battery, power magnet of sequence switch 100, conductor 30, contact 112, right-hand armature and back contact of relay 26, to ground, for moving this sequence switch out of position 5 and into position 11.

It is to be understood that the brush rod 32 is again advanced to hunt for an idle trunk in the selected group in some sequence switch position between 5 and 11, and upon the seizure of such trunk is advanced to position 11, but it has not been considered necessary to disclose this well-known operation.

The incoming switch, indicated by brushes and terminals at 39, is operated in accordance with the setting of the keys in the incoming brush and incoming group columns in positions 8 and 10 of the sending sequence switch 300. Hunting then takes place at the incoming switch and when an idle final switch has been seized, it is set in accordance with the designation of the final brush, tens and units keys, in positions 12, 14 and 16 of the sender sequence switch. The final switch is indicated by brushes and terminals at 40 in Fig. 1. When the sender sequence switch is moved out of position 16 upon the final energization of the 0' counting relay, the sender sequence switch moves from position 16 to position 1. In passing through positions 17 and 18, a circuit is completed from grounded battery, power magnet of sequence switch 200, contact 309 to ground, which moves sequence switch 200 from position 4 to position 8.

In position 8 of sequence switch 200, a circuit is completed from ground, contact 211, brush 16, terminal 21, conductor 41, contact 114, power magnet of sequence switch 100, to grounded battery, which moves sequence switch 100 from position 11 to position 16.

After the sender sequence switch 300 has returned to normal position, a circuit is completed from grounded battery, down-drive magnet 42, contact 310, contact 212, to ground. Brush rod 11 is returned to normal position under the control of magnet 42 and when it reaches normal position, a circuit is completed from grounded battery, power magnet of sequence switch 200, contact 213, commutator segment 43, brush 44, to ground, which moves sequence switch 200 from position 8 to position 1, and breaks the circuit of down-drive magnet 42.

Sequence switch 100 is now in position 16, which is the talking position, and it has been assumed that the switches 39 and 40 have moved into their talking positions after the called subscriber has been successfully signaled. The connection is now complete and the parties may converse.

At the conclusion of conversation both parties replace their receivers, and the operator at 0 is informed by the lighting of supervisory signals (not shown), controlled by supervisory relays 45 and 46, that connection is no longer desired. She thereupon removes plug 4 from jack 5, causing the deënergization of relay 7, which completes a circuit from grounded battery, power magnet of sequence switch 100, contact 115, armature and back contact of relay 7, to ground, for moving this sequence switch from position 16 to position 18. A circuit is now completed from grounded battery, down-drive magnet 47, contact 116, to ground.

The brush rod 32 is restored to its normal position, and, on reaching normal position, a circuit is closed from grounded battery, power magnet of sequence switch 100, conductor 30, contact 117, commutator segment 48, brush 38 to ground, which moves this sequence switch from position 18 into position 1, thereby opening the circuit of magnet 47. The restoration of a district switch causes the restoration of switches 39 and 40 in the well-known manner. All parts of the apparatus have now been restored to their normal positions and are ready for re-use.

If now it is desired to test the accuracy of operation of the sender, this may be done by connecting jacks 54 and 55 with jacks 50 and 51 by means of link connectors 52 and 53. Assuming that the same number of impulses are to be sent as in the previous setting of the connecting switches, the same keys will be set in the operator's key set shown in Fig. 3, that is, key No. 4 in the district brush column, key No. 2 in the district group column, key No. 1 in the incoming brush column, key No. 1 in the incoming group column, key No. 4 in the final brush column, key No. 1 in the tens column and key No. 6 in the units column. Corresponding keys will be depressed on the test box key set shown in Fig. 5.

The testing operator now depresses start key 56, whereupon a circuit is completed from grounded battery, power magnet of progress-controlling sequence switch 400, contact 402, contacts of start key 56, to ground, which causes sequence switch 400 to move out of position 1 and into position 2 under the control of its normal spring 401. A circuit is now completed from grounded battery, winding of relay 9, contacts 203, 202, jack 55, sleeve conductor of link 53, sleeve contact of jack 51, contact 403, to ground. Relay 9 is energized and completes a circuit from grounded battery, power magnet of sequence switch 200, contact 204, right armature and front contact of relay 9 to ground, which moves the sequence switch out of position 1 into position 2. Relay 9 locks up over a circuit from grounded battery, winding of relay 9, its left-hand armature and front contact, contact 206, left-hand armature and back contact of relay 22, to ground.

In position 2 of sequence switch 200 a circuit is completed from grounded battery, up-drive magnet 10, contact 205, armature and front contact of relay 9 to ground, which causes the cord finder brush shaft 11 to be moved upwardly, advancing the brushes 12, 13, 14, 15 and 16 over terminals 17, 18, 19, 20 and 21 respectively. When the cord finder brushes engage the terminals to which the test jacks 54 and 55 are connected, relay 22 is energized over a circuit from grounded battery, winding of relay 22, contact 207, brush 12, terminal 17, ring contact of jack 55, ring conductor of link 53, ring contact of jack 51, contact 404 to ground, and immediately locks up over a path from grounded battery, winding of relay 22, contact 208, right-hand armature and front contact of relay 22, brush 13, terminal 18, tip contact of jack 55, tip conductor of link 53, tip contact of jack 51, contact 405 to ground. The energization of relay 22 opens one branch of the locking circuit of relay 9, but this relay is maintained energized over a branch path as previously described until the brush set is accurately centered on the desired terminal set. Relay 9 then deënergizes, opening at its right-hand armature and front contact the circuit of up-drive magnet 10, and completing at its right-hand armature and back contact a circuit to move sequence switch 200 from position 2 to position 3 as previously described.

From this point the operation is the same as previously described until sequence switch 300 arrives in position 4, at which time sequence switch 200 is also in position 4. At this time relay 57 is energized over the fundamental circuit, this circuit extending from grounded battery, winding of relay 57, contact 502, conductor 60, contact 406, tip contact of jack 50, tip conductor of link 52, tip contact of jack 54, terminal 20, brush 15, conductor 58, outer armature and back contact of the 0' counting relay, winding of stepping relay 28, contact 304, brush 14, terminal 19, ring contact of jack 54, ring conductor of link 52, ring contact of jack 50, contact 407, to ground.

Relays 57 and 28 are energized in this circuit, relay 57 locking itself to conductor 60 through its left-hand armature and front contact, while stepping relay 28 completes a circuit for the No. 4 counting relay through the closed contacts of the No. 4 key in the district brush column as previously described.

Relay 57 also completes a circuit from grounded battery, power magnet of impulser sequence switch 500, armature and back contact of relay 59, contact 503, right-hand armature and front contact of relay 57 to ground, for moving sequence switch 500 out of its normal position and into a position determined by the operation of the sender shown in Fig. 3.

Impulse sequence switch 500 may be a sequence switch of the usual type of construction, and is arranged to continue rotation, after being started, as long as relay 57 is energized, and operates to shunt out the stepping relay by the intermittent closure of its contact 504 as will now be described.

It should be noted, however, that relay 57 will in no case remain energized after the twelfth position is passed, since the function of relay 57 is to stop sequence switch 500 in a position to correspond with the number of impulses counted off by the counting relays in Fig. 3.

When sequence switch 500 reaches position N½, stepping relay 28 is deënergized to permit the energization of the No. 4' counting relay, since it is shunted by a path from grounded battery, winding of relay 57, left-hand armature and front contact of relay 57, contact 504, to ground.

When sequence switch 500 leaves position N½, the stepping relay is again energized and in turn energizes the No. 3 counting relay. In position 0½ of the sequence switch 500, stepping relay 28 is again shunted and allows the No. 3' counting relay to energize. When sequence switch 500 leaves position 0½, the No. 2 counting relay is energized this process continuing until the 0' counting relay is energized, which will take place when sequence switch 500 arrives in position 3½. The energization of the 0' counting relay results in the permanent opening of the lower branch path of relay 57, and when sequence switch 500 leaves position 3½ the upper branch path of relay 57 is broken, whereupon it deënergizes and sequence switch 500 will move into position 4 under the control of its normal spring 501 and stop in this position.

With sequence switch 400 in position 2, lamp 61 is lighted over a circuit from grounded battery, lamp 61, contact 408 to ground, indicating to the testing operator that the progress-controlling sequence switch 400 is in position 2, in which position the district brush-selecting impulses are to be sent. At the same time a circuit exists for matching lamp 62 from grounded battery, lamp 62, closed contacts of district brush key No. 4, conductor 63, contact 408, to ground. The lighting of these two lamps informs the testing operator that the district brush-selecting impulses are being sent at this stage of operation and that the No. 4 key has been depressed.

With sequence switch 500 in position 4, a circuit will be completed for matching lamp 63, adjacent to lamp 62, from grounded battery, lamp 63, contact 505, conductor 65, right-hand armature and back contact of relay 57 to ground. The lighting of lamp 63 informs the testing operator that the desired number of impulses has been correctly sent.

A circuit is also completed at this time for relay 59 from grounded battery, winding of relay 59, conductor 66, closed contacts of key 87, contact 409, conductor 67, closed contacts of key No. 4 in the district brush column, conductor 68, contact 505, conductor 65, right-hand armature and back contact of relay 57 to ground. Relay 59 completes an alternate energizing circuit for itself from grounded battery, winding of relay 59, contacts 506 and 410, right-hand armature and front contact of relay 59, to ground. Relay 59 also completes a circuit from grounded battery, power magnet of sequence switch 500, left-hand armature and front contact of relay 59, contact 507, conductor 65, right-hand armature and back contact of relay 57 to ground, which moves the sequence switch 500 from position 4 into position 15.

In position 15 of sequence switch 500, a circuit is completed from grounded battery, contact 411, winding of relay 69, upper armature and back contact of relay 70, conductor 71, contact 508, to ground. Relay 69 is energized and locks itself to ground at its lower armature and front contact, and at its upper armature and front contact completes a circuit from grounded battery, power magnet of sequence switch 500, contact 509, upper armature and front contact of relay 69, contact 412, to ground, which moves sequence switch 500 from position 15 to position 16. On leaving position 15 the holding circuit of relay 59 is broken at contact 506 and this relay deënergizes. A circuit is now completed from grounded battery, winding of sequence switch 400, conductor 72, contact 510, upper armature and front contact of relay 69, contact 412, to ground, for moving sequence switch 400 from position 2 to position 3.

In position 3 of sequence switch 400, the locking circuit of relay 69 is broken at contact 411, and a circuit is established from grounded battery, power magnet of sequence switch 500, left-hand armature and back contact of relay 59, contact 511, lower armature and back contact of relay 70, contact 413 to ground, which moves sequence switch 500 out of position 16 into its normal position.

The energization of the 0' counting relay completed a circuit from grounded battery, power magnet of sequence switch 300, inner armature and front contact of 0' counting relay, contact 306 to ground, which moves sequence switch 300 from position 4 to position 6.

With the sequence switch 400 in position 3, a circuit is completed for progress lamp 73 from grounded battery, lamp 73, contact 414 to ground, and a circuit is completed for matching lamp 74 from grounded battery, lamp 74, closed contacts of district group key No. 2, conductor 75, contact 414, to ground. The lighting of progress lamp 74 informs the testing operator that the district group impulses are to be sent next, and the lighting of lamp 74 shows which lamp in the second series of matching lamps should next be lighted.

When sequence switch 500 arrives in its normal position and the sender sequence switch 300 arrives in position 6, relay 57 is again energized over the fundamental circuit as before described. As before, the circuit of stepping relay 28 is intermittently shunted by the action of contact 504, and when the 0' counting relay is energized, which occurs when sequence switch 500 leaves position 1½, relay 57 is deënergized and sequence switch 500 will come to rest in position 2. At this time a circuit will be completed from grounded battery, lamp 76, contact 512, conductor 65, and armature and back contact of relay 57 to ground, the lighting of lamps 74 and 76 again indicating to the testing operator that the correct number of impulses have been sent. Relay 59 is energized and locks up as before. When sequence switch 500 reaches position 15, relay 70 will be energized over a circuit from grounded battery, contact 415, winding of relay 70, lower armature and back contact of relay 69, conductor 71, contact 508 to ground. Relay 70 locks itself to ground at its upper armature and front contact until sequence switch 400 leaves position 3 and contact 415 is opened, irrespective of the position of sequence switch 500. A circuit is now completed from grounded battery, winding of the power magnet of sequence switch 500, contact 509, lower armature and front contact of relay 70, contact 413 to ground, for moving sequence switch 500 out of position 15 and into position 16.

In position 16 of sequence switch 500, a circuit is completed from grounded battery, power magnet of sequence switch 400, conductor 72, contact 510, lower armature and front contact of relay 70, contact 413 to ground, for moving sequence switch 400 out of position 3 and into position 11.

On leaving position 3 relay 70 is deënergized, and a circuit is completed from grounded battery, power magnet of sequence switch 500, left-hand armature and back contact of relay 59, contact 511, upper armature and back contact of relay 69, contact 412 to ground, for moving sequence switch 500 out of position 16 and back to its normal position.

The testing operation continues in this manner until all the sets of impulses have been sent, the circuits operating in a manner similar to that described until the last test is made in position 15 of sequence switch 400. When sequence switch 400 is moved out of position 15, it returns to its first or normal position and the testing apparatus is in a condition for re-use.

Referring now to that stage of operation in which the district brush selecting impulses were being sent, it will be assumed that the sender shown in Fig. 3 operates incorrectly and that only four impulses are sent. As a result, sequence switch 500 will stop in position 3. A circuit will then be completed from grounded battery, lamp 97, contact 513, conductor 65, right-hand armature and back contact of relay 57, to ground. Since lamps 62 and 77 are not adjacent, the testing operator will be at once advised that the sender has operated incorrectly. Moreover, relay 59 will fail to find an energizing circuit for itself through closed contact of depressed key No. 4 in the district brush column and contact 504, and as a result of the failure of relay 59 to energize, sequence switch 500 will not move out of position 3 and the progress of the testing operation will be stopped.

It will thus be seen that relay 59 controls the continuity of the testing operation and that as long as the sender being tested operates correctly, sequence switch 500 will be restored to its normal position and moves sequence switch 400 to the next testing position, but that upon the failure of the sender to operate correctly, the testing process will be discontinued.

Key 97 is provided so that if the testing apparatus is brought to rest as a result of incorrect operation, depression of key 97 will cause the energization of relay 59, whereupon sequence switch 500 will move into position 15 and the test may be continued as described.

If for any reason the testing operator desires to stop operation of the testing device, he may do so by depressing key 87, which, in opening its contacts, prevents the closure of the circuit of relay 59 and therefore will hold sequence switch 500 in whatever position it has moved to until such time as the operator wishes the testing to be continued.

What is claimed is:

1. In a testing system, a sending device arranged to control the sending of a plurality of sets of impulses, a testing device, means to operate said testing device to test the correctness of the first set of impulses sent, means to advance the operation of said testing device to a stage wherein the correctness of the next set of impulses may be tested, means to repeat the advancing operation of said testing device upon the completion of the sending of each set of impulses until all the sets of impulses have been sent, and means to prevent further operation of said testing device if an incorrect number of impulses are sent.

2. In a testing system, a sending device arranged to control the sending of a plurality of sets of impulses, a testing device, means to operate said testing device to test the correctness of the successive sets of impulses, means operable upon the termination of the correct sending of a set of impulses to move said testing device to a position to receive the next set of impulses, and means to prevent further action of the testing device if said sending device operates incorrectly.

3. In a testing system, a sending device arranged to control the sending of a plurality of sets of impulses, a register, a control switch therefor, means operated in accordance with the settings of said register to indicate whether or not the successive sets of impulses have been correctly sent, means to advance said control switch, upon the termination of the correct sending of a set of impulses, to a position wherein said register may receive the next set of impulses, and means to prevent the progress of said control switch if said sender operates incorrectly.

4. In a testing system, a sending device, a control switch therefor, means to allow operation of said control switch, a register, a controlling switch therefor, means to position said register in accordance with the operation of said sender, means operable upon the termination of the sending of a set of impulses to move said sending control switch to a position wherein a second set of impulses may be sent, means operated in accordance with the setting of said register to indicate whether or not the set of impulses has been correctly sent, means to restore said register to normal, said restoring means being operative only when a set of impulses has been correctly sent, and means operable during the return of said register to advance said register controlling switch to a position wherein reoperation of said register may take place.

5. In an automatic telephone exchange system, a sending device, a controlling switch therefor, an operator's key set, means to successively operate said sending device in accordance with the setting of said key set, a testing operator's key set, a testing device including a register and a controlling switch therefor, a series of lamps, there being one for each digit in the testing operator's key set, means to light a desired lamp in each position of said register controlling switch, a second series of lamps, means to light one of said lamps in accordance with the setting of said register to indicate whether or not a set of impulses has been correctly sent, means to restore said register to its normal position upon the termination of the correct sending of a set of impulses, and means operable during the return of said register to advance said register controlling switch to a position wherein reoperation of said register may take place.

6. In a testing device, a register, a controlling switch associated therewith, means to position said register, means controlled by said register and indicative of the result of the test, a relay, means for energizing said relay simultaneously with the positioning of said register, a circuit controlled at contacts of said relay, said circuit controlling the return of said register to its normal position, and means operable during the return of said register to advance said controlling switch to a position wherein reoperation of said register may take place.

7. In a testing system, a sending device, a controlling switch therefor, means to allow operation of said sender in certain positions of said controlling switch, a register, a controlling switch therefor, means to position said register in accordance with the operation of said sender, means operable on the termination of the sending of a set of impulses to move said sending controlling switch to a position wherein a second set of impulses may be sent, means operated in accordance with the setting of said register to indicate whether or not a set of impulses has been correctly sent, a relay, a circuit controlled at contacts of said relay, means for energizing said relay upon the termination of the correct sending of a set of impulses, means including said control circuit to restore said register to its normal position, and means operable during the return of said register to advance said register controlling switch to a position wherein reoperation of said register may take place.

8. In a testing system, an impulse producing mechanism, an impulse operated device for controlling said mechanism to cause it to produce successive sets of impulses, a testing device arranged for use with said controlling device, means to operate said testing device to test the accuracy of the successive operations of said controlling device, and means to automatically discontinue the operation of said testing device if said controlling device operates incorrectly.

In witness whereof, I hereunto subscribe my name this 26th day of December, A. D. 1916.

ALBEN E. LUNDELL.

In witness whereof, I hereunto subscribe my name this 28th day of December, A. D. 1916.

EDMUND W. HANCOCK.